(12) United States Patent
Lewis et al.

(10) Patent No.: US 6,371,575 B1
(45) Date of Patent: Apr. 16, 2002

(54) VIGILANCE SYSTEM

(75) Inventors: Roger B. Lewis, Stem, NC (US); Donald Baergen, Ontario (CA)

(73) Assignee: New York Air Brake Corporation, Watertown, NY (US)

( * ) Notice: Subject to any disclaimer, the term of this patent is extended or adjusted under 35 U.S.C. 154(b) by 13 days.

(21) Appl. No.: 09/615,747

(22) Filed: Jul. 13, 2000

Related U.S. Application Data
(60) Provisional application No. 60/144,037, filed on Jul. 16, 1999.

(51) Int. Cl.[7] ................................................ B60T 8/34
(52) U.S. Cl. .......................................... 303/128; 303/3
(58) Field of Search ........................... 303/3, 7, 9, 9.61, 303/9.66, 122.05, 127, 128; 364/426.01, 426.05; 701/70, 71

(56) References Cited

U.S. PATENT DOCUMENTS

| | | | |
|---|---|---|---|
| 5,249,125 A | | 9/1993 | Root et al. |
| 5,303,157 A | * | 4/1994 | Root et al. ............. 364/426.05 |
| 5,412,572 A | | 5/1995 | Root et al. |
| 5,590,042 A | * | 12/1996 | Allen, Jr. et al. ....... 364/426.01 |
| 5,718,784 A | | 2/1998 | Roselli et al. |
| 5,721,683 A | | 2/1998 | Joyce, Jr. et al. |
| 6,002,978 A | * | 12/1999 | Marra et al. .................. 701/70 |
| 6,042,201 A | | 3/2000 | Marra et al. |
| 6,098,006 A | * | 8/2000 | Sherwood et al. ............ 701/70 |
| 6,286,911 B1 | * | 9/2001 | Wright et al. .................. 303/3 |

* cited by examiner

Primary Examiner—Christopher P. Schwartz
(74) Attorney, Agent, or Firm—Barnes & Thornburg

(57) ABSTRACT

The vigilance process includes receiving inputs of operator activity and determining the presence or absence of activity inputs during a first delay period. The operator is warned, if activity inputs are absent during the first period. If the warning period expires before being cancelled, a vigilance penalty signal is produced. The brakes are applied for a first predetermined period in response to the vigilance penalty signal.

13 Claims, 3 Drawing Sheets

VIGILANCE SYSTEM

CROSS-REFERENCE

This application claims the benefit of U.S. Provisional Patent Application No. 60/144,037 filed Jul. 16, 1999 which is incorporated herein by reference.

BACKGROUND AND SUMMARY OF THE INVENTION

The present invention relates to rail locomotives and more specifically to a vigilance system within a computer-controlled train brake system.

Vigilance Systems are well known within the industry. These are stand along systems that monitor operator activity during locomotive operation. If the operator appears to be incapacitated through an action, the vigilance system will apply a penalty brake by signalling, the brake control system with an electrical or pneumatic signal. Also, dead man pedal switches have been available and used, as well as ATC switches to provide inputs to a penalty process. An example of such a system in a penalty process is illustrated in U.S. Pat. No. 6,042,201.

The present system is a vigilance process which is included in an electropneumatic brake controller which controls pneumatic braking in response to brake signals and penalty signals. The vigilance process includes receiving inputs of operator activity and determining the presence or absence of activity inputs during a first delay period. The operator is warned, if activity inputs are absent during the first period. If the warning period expires before being cancelled, a vigilance penalty signal is produced. The brakes are applied for a first predetermined period in response to the vigilance penalty signal. The brakes can be reset in response to a reset input from the operator after expiration of the first braking period. The reset input includes determining that the operator has inputted a full service brake request, a zero propulsion request and a reset request. The brake request is from the brake handle and the propulsion request is from a propulsion handle.

Operator activities include one or more of a closed vigilance foot switch, a pressed vigilance button, motion of the propulsion handle and operation of a sander. The warning is cancelled by closing the vigilance foot switch or pressing the vigilance button. The system also includes a mode input and deactivates the vigilance process for a trail mode input. The vigilance process is also deactivated for removal of a key from the system while in a lead mode. The vigilance process is also deactivated for brake cylinder pressure above a predetermined pressure and vehicle speed below a predetermined speed.

A fault process is also included. The fault process determines if a fault condition exists and produces a fault penalty if a fault condition exists. The brakes are applied for a second predetermined period in response to a fault penalty signal. The brakes are released in response to a reset input from the operator after expiration of the second braking period. The reset input includes determining that the operator has inputted a full service brake request, a zero propulsion request and a reset request. The faults include one or more of a sensor being out of range, a pressure transducer out of range, an electropneumatic valve failed and an emergency controller switch open fault.

The vigilance process may also be deactivated in response to a cut-out input during a safe state. The safe state includes a warning not taking place, the first braking period has expired, a brake cylinder pressure is greater than a predetermined pressure, a vehicle speed is below a predetermined speed and the system is in a trail mode.

Other objects, advantages and novel features of the present invention will become apparent from the following detailed description of the invention when considered in conjunction with the accompanying drawings.

DETAILED DESCRIPTION OF THE PREFERRED EMBODIMENTS

The Vigilance System is designed to assure that the vehicle operator remains aware while the vehicle is in motion and in Lead Mode. To do this, the microprocessor controlled air brake system monitors the following inputs and system parameters:

| | |
|---|---|
| Vigilance Push Button | (VIGACK1) |
| Vigilance Foot Switch | (VIGACK1) |
| TE/BE Handle Motion Indicator | (VIGACK2) |
| Sanding Push Button | (VIGACK2) |
| Vehicle "No-Motion" Indicator | |
| TE/BE Position '0' Indicator | |
| Brake Cylinder Pressure | |
| Cab Key Switch | |

An example of a computer controlled locomotive air brake system is the CCBII system available from New York Air Brake Corporation and the system described in Modular Locomotive Brake Controller W098/10967 Published Mar. 19, 1998 and corresponding to U.S. Pat. No. 6,036,284.

Under normal operation, the operator is required to press the foot switch or buttons, move the power or propulsion controller or TE/BE handle, or operation of the sander at least once in a preset time period (default 60 seconds, for example). Should the operator fail to comply, a warning buzzer and light will be activated for a preset time period (default 6 seconds). During this warning period, the operator can only cancel the warning by pressing the Vigilance Push Button or Foot Switch. Failing to do this during the warning period will force a penalty brake application. Once the penalty application is induced, there is a minimum waiting period imposed before the operator may reset the penalty (default 120 seconds, for example). When this period has expired, the operator may only reset the penalty by moving the automatic brake handle to the Full Service position, moving the TE/BE handle to Position '0' and pressing the Vigilance Reset Push Button.

While in Lead Mode, the Vigilance control system may be "suppressed", or rendered temporarily inactive by the operator charging Brake Cylinder to more than 25 PSI, for example, OR bringing the vehicle speed to less than 1.5 kph, for example.

When a brake control system fault occurs that is defined to cause a penalty (e.g., ER control fault), a penalty application will occur, followed by a waiting period (default 30 seconds). Following this waiting period, the operator may only reset the penalty by moving his automatic brake handle to the Full Service position, moving the TE/BE or propulsion handle to Position '0' and pressing the Vigilance Reset Push Button.

The Vigilance Control Process may be disabled by the operator through the use of the cut-out or the Vigilance Enable Switch. Once disabled, Vigilance Control will not monitor operator activity until it is re-enabled with the breaker or switch. The disabled state will only be recognized when the vehicle is in a "safe" state: i.e., after a penalty brake application has been made or when Vigilance is suppressed or the vehicle is in Trail.

Figure 1:
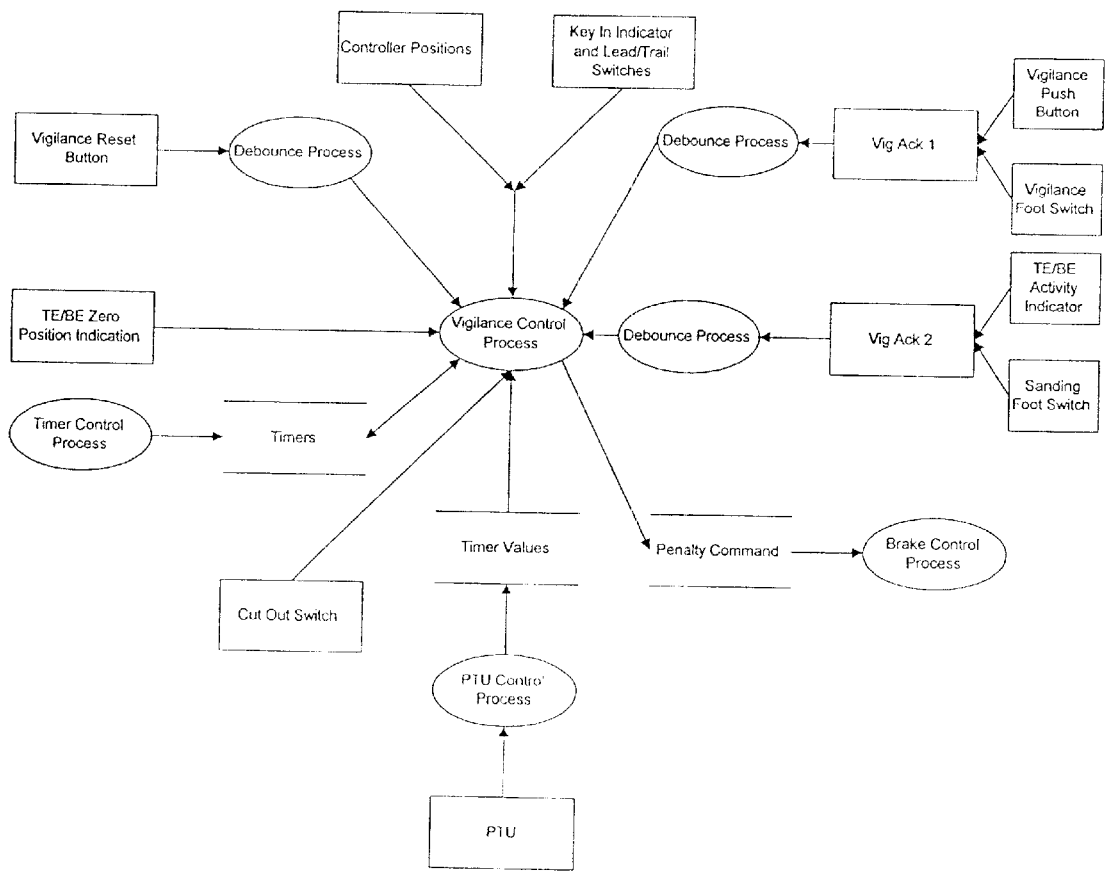
FIG. 1 is a flow chart of the communication of data and control between systems and process in software according to the present invention.

As shown in FIG. 1, the process is performed on the microprocessor of the locomotive brake system.

The Vigilance Foot Switch and Vigilance Push Button are presented to the microprocessor through a single signal input, referred to as "VIGACK1". The TE/BE Activity indication and Sanding Foot Switch are read by the microprocessor through a single input known as "VIGACK2".

The Vigilance Reset Push Button, VIGACK1 and VIGACK2 inputs are conditioned with a debounce process that assures that the switch is opened after it has been closed before another closure is reported to the Vigilance Process. A debounce process is described below and illustrated in FIG. 3.

The TE/BE Zero Position indicator and cut-out switch are already debounced by the Locomotive control system, so that value is read directly by the Vigilance Process.

The various values assigned to the Timers will be stored in Non-volatile RAM and may be changed through the Portable Test Unit (PTU). Once changed, they will remain at the new value until they are changed again, the fault log is cleared by the PTU, or new software is installed in the CPU.

The Vigilance Process will request Penalty applications though the Penalty Command interface with the Brake Pipe Control process (variable "Penalty"). One method of penalty processing is described in U.S. Pat. No. 6,042,201 incorporated herein by reference. A penalty message or flag is provided to the penalty processor. The vigilance process is on the same processor as the penalty process and other brake control processes.

The controller position indicators and the Key-in indicators will be read directly by the Vigilance Control Process.

When any of the Timers are set to a non-zero value, there value will be decremented (updated) by the Timer Control Process which is located with the "HandleTimers" process used by the other control processes in the locomotive brake system.

The process or operation of the Vigilance System will be explained in reference to the transition state diagram of FIG. 2.

Init State

The initialization or Init State is only entered from CPU reset. This State assures that all internal variables in the control process are set to a proper value. Once these internal variables have been initialized, the Vigilance Process will enter the Delay State, transition T0.

Delay State

The primary state, the Delay State, has a preset period normally set at 60 seconds, for example, (which may be adjusted though the PTU). This cycle is automatically restarted whenever the vigilance process detects one of a number of external inputs, (derived from other vehicle control functions under the driver's control, transition A1. The presence of which automatically infers that the driver has taken some positive action and is therefore vigilance. These control functions include:

1. Movement of the driver's power controller or propulsion handle.

2. Operation of the sander.

3. Operation of the vigilance acknowledge push button or pedal.

In normal circumstances, provided that the driver is periodically performing some positive action, the Delay State will be continually reset and will never run to completion, transition A1. Only if the driver fails to perform such an action within the Delay State period, either because no change to vehicle operating conditions has been required within that period, or because he has become incapacitated, will the delay cycle period expire.

When such an event occurs, the Action State will be initiated, including audible and visual warnings to the driver, transition T6. From the Delay State, the system can also transition to the Isolated State transition T1 or to the suppressed state isolate T3 for the conditions to be described below.

Isolate State

When the vehicle has been placed into Trail Mode, or when it is Lead Mode and the key has been removed, the Vigilance Process will enter the Isolate State. The Isolated State can be entered from the delay state, transition T1 or from the suppressed state, transition T20. During this State, no operator activity or faults will be monitored. The Vigilance Process will remain in the Isolate State as long as the vehicle is in Trail Mode.

Cutout State

During the Cutout State, no operator activity or faults will be monitored. The Cut-out State may be entered only when the cut-out circuit breaker or cut-out switch is set indicating a vigilance cut-out condition and the vigilance process is in the following states:

Delay (transition T16)

Isolate (transition T15)

Suppress (transition T17)

Brake Waiting (after penalty application completed) (transition T19)

Fault Waiting (after penalty application completed) (transition T18)

When the cut-out condition is no longer activated, the system enters the Delay State, transition T21.

Suppress State

Provision is included within the unit to suppress the operation of the vigilance system when, for example, the vehicle is stationary and continual proof of driver vigilance is not required. Vigilance suppress is initiated by an external input to the system, derived from a vehicle speed sensor or brake cylinder pressure transducer. Vigilance may only be suppressed during the Delay State, that is, when the vehicle is operating normally. For example, if the brake cylinder pressure is above 25 PSI or the speed is less than 1.5 kp, suppress state is initiated from the Delay state, transition T3.

In addition, to permit the vigilance system to be disabled on a slave locomotive in multiple unit operation, the vigilance is also automatically suppressed whenever both cab reversers are set to the Off position. In other words, when the vehicle is in Trail Mode.

If the vehicle speed and brake cylinder pressure reach are above preset levels, then the suppressed state cycles back to the Delay State (transition T9). As previously discussed, this would require, for example, brake cylinder pressure of less than 25 PSI and an engine speed greater than 1.5 kph. If a fault occurs, then the Suppressed State will transition to the fault timing state (T10). If the cut-out condition is detected, the Suppressed State will transition to the cut-out state, transition T17.

Action State

The Action State is entered whenever the Delay State timer expires, transition T6. This indicates that no driver action has been detected for the length of the delay cycle period. The length of the warning period of the Action State is normally set at 6 seconds, for example, which is adjustable through the PTU.

In order to maintain normal vehicle operation, the driver must now operate the Vigilance Acknowledge pedal or push button before the warning period of the action timer expires, to prove positively that he has not become incapacitated. The monitoring in the time period is represented by transition state A2.

Once reset or cancelled in this manner, system operation reverts to the Delay State, transition T5, and normal vehicle operation is maintained.

If a fault occurs during an Action State, the Fault State is initiated by transition T11. If the action timer expires, the Brake Timing State is entered, transition T14.

Fault State

The operation of the vigilance system is continuously monitored by its own built in test routines. If, at any time, a condition is detected which could lead to unsafe system operation, a brake application is immediately initiated, and a fault indication is given. In addition to the vigilance fault, Penalty Reduction is defined as a 1.6 Bar reduction below Temporary Release. Temporary Release is defined as Release plus result of Assimilation. Faults are any electronic air brake faults that result in a penalty application.

The following fault conditions will cause a Fault Penalty Application:
1. Automatic handle frequency out of acceptable range.
2. ER Transducer out of range.
3. BP Transducer out of range.
4. AD Board Reference voltage out of range.
5. ER Supply failure.
6. ER Exhaust failure.
7. MVER failure.
8. Emergency Controller switch open fault.

The Fault State has a preset period normally set at 30 seconds, for example, (adjustable through the PTU), during which period the brake application cannot be canceled. This is the Fault Timing state.

Only after the expiration of the Fault State timing can the Fault Waiting State entered transition, T12. After removal of the condition that caused the fault and provided that the power controller or propulsion handle has been set to the Off position or zero propulsion request and the Automatic Brake Handle of the active controller placed into the Full Service Position, an attempt can be made by the driver to reset the fault condition, and resume normal vehicle operation using the Vigilance Reset push button.

Fault Timing State

Upon entry into the Fault Timing State, Delay State (transition T8), the Suppressed State (transition T10) and the Action State (transition T11), the brake application has been initiated. During this state, the timer is monitored until it expires. Only then will the Vigilance Control process enter the Fault Waiting State, transition T12.

Fault Waiting State

Only during the Fault Waiting State does the Vigilance Control Process begin looking for a reset of the fault condition or operator input. Once the conditions are favorable, the brake application and penalty will be removed and the process will return to the Delay State for normal operation, transition T7.

An exception to the normal inputs is made when the Cut-out circuit breaker, or cut-out switch is set indicating a Vigilance Cutout condition, in which case the Vigilance Control Process will enter the Cutout State, transition T18.

Brake State

The Brake State is initiated if the operator fails to respond to the audible and visual warnings before the expiration of the Action State timer, transition T14. A brake application is immediately initiated. There are two sub-states to the Brake State: the Brake Timing State and the Brake Waiting State.

Brake Timing State

The Brake State has a preset period normally set at 2 minutes, for example, (adjustable through the PTU), during which period the brake application can not be canceled. This ensures that the vehicle is brought to a complete standstill.

Brake Waiting State

After the expiration of the Brake Timing State timer, the Brake Waiting State is entered, transition T13. After the power controller or propulsion handle has been set to the Off position or zero propulsion request and the Automatic Brake Handle of the active controller placed into the Full Service Position, the vigilance system can be reset using the Vigilance Reset push button. The brake application is then released, the audible and visual warnings are canceled, and normal vehicle operation may be re-established, normally to the delay state, transition T4. If a cut-out condition is detected, then the transition is to the cut-out state transition T19.

Figure 2:
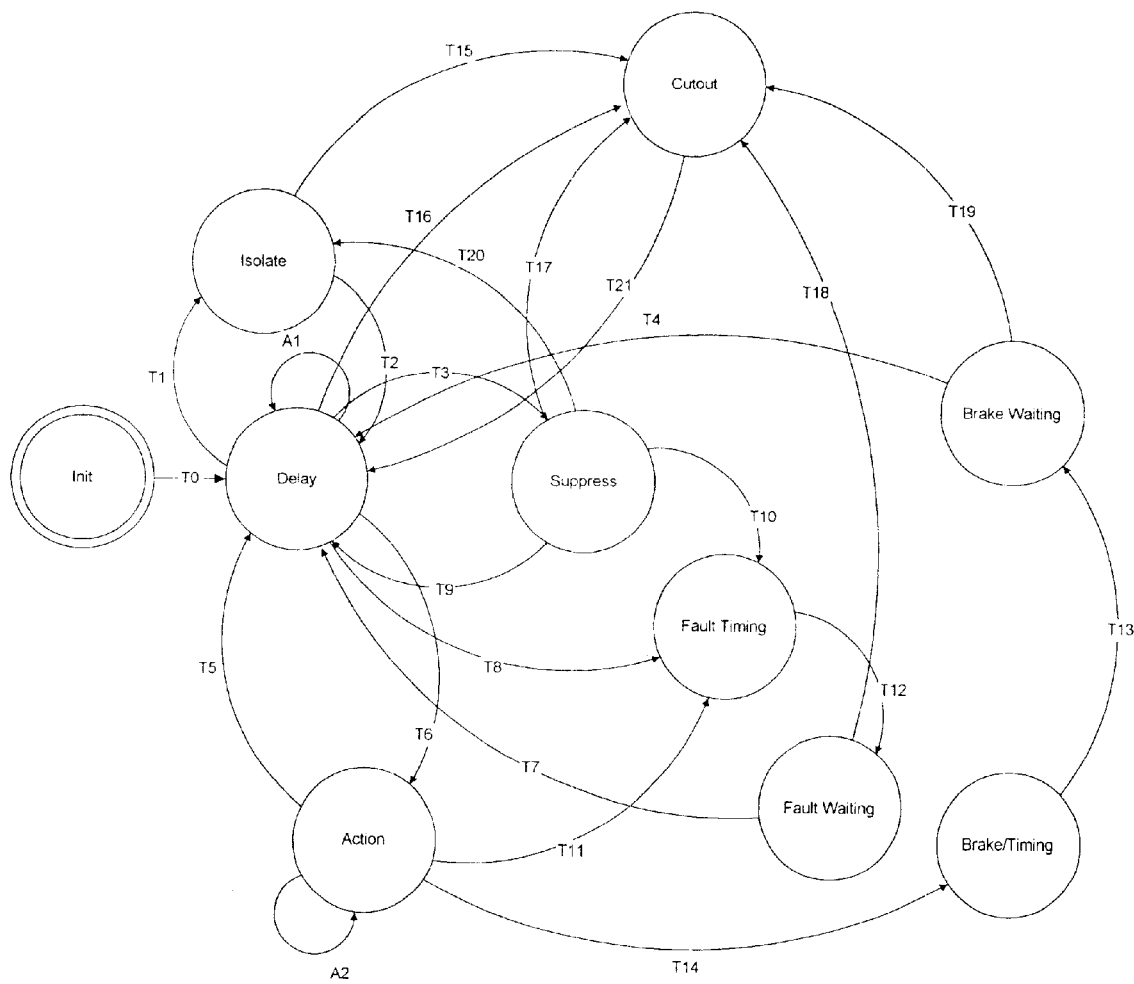
FIG. 2 is a state transition diagram according to the present invention.

State Transition Matrix for FIG. 2

| Transition | Input/Event | Output/Action | Old State | New State |
|---|---|---|---|---|
| T0 | Power Up | Set Delay timer = Delay Timer Value | Init | Delay |
| T1 | Unit switched to Trail OR Lead with no key inserted | <> | Delay | Isolate |
| T2 | Unit switched to Lead AND key inserted | Set Delay Timer = Delay Timer Value | Isolate | Delay |
| T3 | BC pressure > 25 PSI OR speed < 1.5 kph | <> | Delay | Suppress |
| T4 | Brake handle of selected cab in Full Service AND TE/BE handle in position '0' AND Vigilance Reset P/B activated AND No Penalty Faults active | Clear Vigilance Penalty bit, set Delay Timer = Delay Timer Value, Turn K6 OFF | Brake Waiting | Delay |

-continued

State Transition Matrix for FIG. 2

| Transition | Input/Event | Output/Action | Old State | New State |
|---|---|---|---|---|
| T5 | Foot switch pressed OR Push Button pressed | Set Delay Timer = Delay Timer Value, turn K6 OFF | Action | Delay |
| T6 | Delay timer expires | Set Delay Timer = Action Timer Value, turn K6 ON | Delay | Action |
| T7 | Fault cleared AND Power Controller set to OFF position AND Push Button pressed | Clear Vigilance Fault Penalty Bit, set Delay Timer = Delay Timer Value | Fault Waiting | Delay |
| T8 | Fault occurs | Set Vigilance Fault Penalty bit, set Reduction Timer = Fault Timer Value | Delay | Fault Timing |
| T9 | BC pressure ≦ 25 PSI AND speed ≧ 1.5 Kph | Set Delay Timer = Delay Timer Value | Suppress | Delay |
| T10 | Fault occurs | Set Vigilance Fault Penalty bit, Set Reduction Timer = Fault Timer Value | Suppress | Fault Timing |
| T11 | Fault occurs | Set Vigilance Fault Penalty Bit, set Reduction Timer = Fault Timer Value, turn K6 OFF | Action | Fault Timing |
| T12 | Reduction timer expires | <> | Fault Timing | Fault Waiting |
| T13 | Reduction timer expires | <> | Brake Timing | Brake Waiting |
| T14 | Action timer expires | Set Reduction Timer = Penalty Timer Value, Set Vigilance Penalty bit | Action | Brake Timing |
| T15 | Cutout Condition Detected | <> | Isolate | Cutout |
| T16 | Cutout Condition Detected | <> | Delay | Cutout |
| T17 | Cutout Condition Detected | <> | Suppress | Cutout |
| T18 | Cutout Condition Detected | Clear Vigilance Fault Penalty Bit | Fault Waiting | Cutout |
| T19 | Cutout Condition Detected | Clear Vigilance Penalty Bit | Brake Waiting | Cutout |
| T20 | Unit switched to Trail OR Lead with no key inserted | <> | Suppress | Isolate |
| T21 | Cutout Condition No Longer Active | Set Delay Timer = Delay Timer Value | Cutout | Delay |
| A1 | TE/BE handle movement Or Sanding Button pushed OR Vigilance Push Button pressed OR Foot pedal pushed | Set Delay Timer = Delay Timer Value | Delay | Delay |
| A2 | Vigilance push button NOT pressed AND Foot pedal NOT pushed AND Delay timer NOT expired | K6 ON | Action | Action |

The debounce process for the Pushbuttons and foot switches will be run each time the button or foot switch is polled (read by the vigilance process). This process will assure that only one "ON" condition will be reported for each switch press. This is essential a "button-up" scheme—that is, the reported value will only change after a buttons-up condition is detected.

Figure 3:
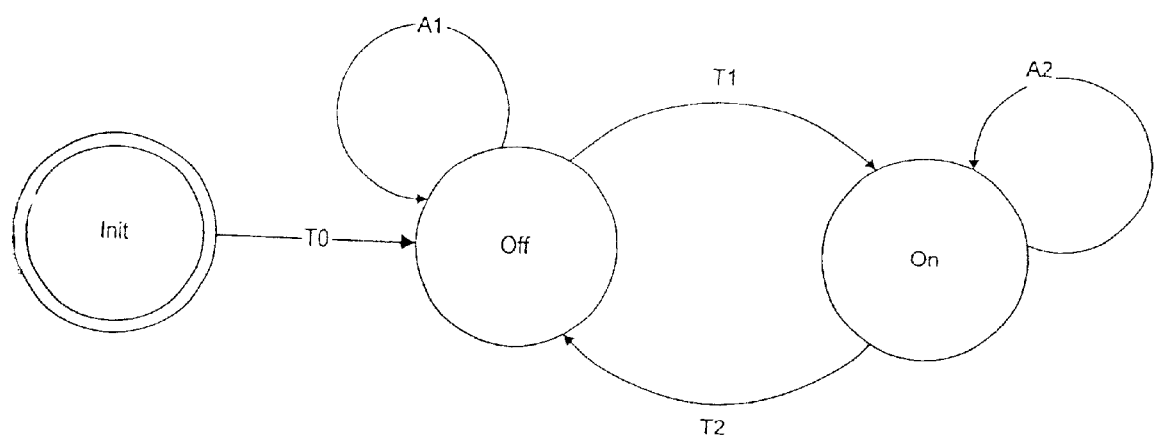
FIG. 3 is a state transition diagram for switch debouncing.

As shown in FIG. 3, the initial state is INIT. The transition from the initial state to an off-state is after power up/reset. As long as the input is off, the off-state is maintained as illustrated by transition A1. When the switch input is on, the state is transitioned from the off-state to the on-state, transition T1. As long as the input stays in the on-state, the value returns to on as illustrated by transition A2. When the input changes from on to off, the transition from state is transitioned from the on-state to the off-state, transition T2. Thus, multiple on-states cannot be detected if there is not any intervening off-state.

State Transition Matrix For FIG. 3

| Transition | Input/Event | Output/Action | Old State | New State |
|---|---|---|---|---|
| T0 | Power up/reset (first invocation) | Set return value to OFF | Init | Off |
| T1 | Input changes to ON | Set return value to ON | Off | On |
| T2 | Input changes to OFF | Set return value to OFF | On | Off |

-continued

State Transition Matrix For FIG. 3

| Transition | Input/Event | Output/Action | Old State | New State |
|---|---|---|---|---|
| A1 | Input still OFF | Set return value to OFF | Off | Off |
| A2 | Input still ON | Set return value to ON | On | On |

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. In a computer controlled train brake system including an electropneumatic brake controller which controls pneumatic train braking in response to braking signals and penalty signals, said brake controller further including a vigilance process which comprises:

receiving inputs of operator activity;

determining presence or absence of activity inputs during a first delay period;

warning the operator for a warning period if activity inputs are absence during the first period;

determining if the operator has cancelled the warning before the expiration of the warning period;

producing a vigilance penalty signal if the warning period expires before being cancelled;

applying the brakes for a first predetermined braking period in response to a vigilance penalty signal;

generating a brake reset if the operator has inputted a full service brake request, a zero propulsion request and a reset request; and releasing the brakes in response to the brake reset after expiration of the first braking period.

2. The system according to claim 1, including a fault process for determining if a fault condition exists; producing a fault penalty signal if a fault condition exists; and applying the brakes for a second predetermined braking period in response to the fault penalty signal.

3. The system according to claim 2, including releasing the brakes in response to a reset input from the operator after expiration of the second braking period.

4. The system according to claim 3, wherein the reset input includes determining that the operator has inputted a full service brake request, a zero propulsion request and a reset request.

5. The system according to claim 2, wherein the faults include one or more of a sensor being out of range, a pressure transducer being out of range, an electropneumatic valve failed, and an emergency controller switch open fault.

6. The system according to claim 1, inputs of operator activities includes one or more of a closed vigilance foot switch, a pressed vigilance button, motion of a propulsion handle and operation of a sander.

7. The system according to claim 6, wherein the warning is cancelled by the closed vigilance foot switch or the pressed vigilance button.

8. The system according to claim 1, wherein the brake request is from a brake handle and the propulsion request is from a propulsion handle.

9. The system according to claim 1, including determining brake cylinder pressure and vehicle speed and temporarily deactivating the vigilance process for brake cylinder pressure above a predetermined pressure and vehicle speed below a predetermined speed.

10. In a computer controlled train brake system including an electropneumatic brake controller which controls pneumatic train braking in response to braking signals and penalty signals, said brake controller further including a vigilance process which comprises:

receiving inputs of operator activity and a cutout input;

determining presence or absence of activity inputs during a first delay period;

warning the operator for a warning period if activity inputs are absence during the first period;

determining if the operator has cancelled the warning before the expiration of the warning period;

producing a vigilance penalty signal if the warning period expires before being cancelled;

applying the brakes for a first predetermined braking period in response to a vigilance penalty signal;

determining a safe state; and deactivating the vigilance process for a cutout input during the safe state.

11. The system according to claim 10, including a mode input and deactivating the vigilance process for a trail mode input.

12. The system according to claim 11, including deactivating the vigilance process for removal of a key from the system and a lead mode input.

13. The system according to claim 10, wherein a safe state includes one or more of a warning is not taking place, the first braking period has expired, a brake cylinder pressure is greater than a predetermined pressure, a vehicle speed is below a predetermined speed and trail mode.

* * * * *